(12) United States Patent
Ran et al.

(10) Patent No.: US 11,706,644 B2
(45) Date of Patent: *Jul. 18, 2023

(54) ACCESS POINTS WITH VIRTUAL CLIENTS

(71) Applicant: Hewlett Packard Enterprise Development LP, Houston, TX (US)

(72) Inventors: Guangzhi Ran, Beijing (CN); Jianpo Han, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/350,037

(22) Filed: Jun. 17, 2021

(65) Prior Publication Data

US 2021/0314794 A1 Oct. 7, 2021

Related U.S. Application Data

(63) Continuation of application No. 16/639,919, filed as application No. PCT/CN2017/100141 on Sep. 1, 2017, now Pat. No. 11,064,375.

(51) Int. Cl.
*H04W 24/06* (2009.01)
*H04W 84/12* (2009.01)
*H04W 88/08* (2009.01)

(52) U.S. Cl.
CPC ............ *H04W 24/06* (2013.01); *H04W 84/12* (2013.01); *H04W 88/08* (2013.01)

(58) Field of Classification Search
CPC ..... H04L 43/10; H04L 43/0888; H04L 43/50; H04W 24/06; H04W 84/12
See application file for complete search history.

(56) References Cited

U.S. PATENT DOCUMENTS

| 8,027,637 | B1 | 9/2011 | Bims |
| 8,238,834 | B1 | 8/2012 | Bharghavan et al. |
| 10,419,242 | B1 | 9/2019 | Tonsing et al. |
| 10,666,775 | B1* | 5/2020 | Volpe ...................... H04L 43/50 |
| 11,032,314 | B2* | 6/2021 | McGrew ............... H04L 63/126 |
| 11,076,025 | B1* | 7/2021 | Volpe ................... H04L 43/106 |
| 11,574,243 | B1* | 2/2023 | Mallya Kasaragod ..................... G06N 20/00 |
| 2007/0088853 | A1 | 4/2007 | Lee et al. |

(Continued)

FOREIGN PATENT DOCUMENTS

| CN | 101137169 A | 3/2008 |
| CN | 101765133 A | 6/2010 |

(Continued)

OTHER PUBLICATIONS

Geier, J., "Testing a Wireless LAN", Chapter 27, Jun. 1, 2010, 16 Pages.

(Continued)

*Primary Examiner* — Syed Ali
(74) *Attorney, Agent, or Firm* — Hewlett Packard Enterprise Patent Department

(57) ABSTRACT

According to one example of the present disclosure, an access point (AP) comprises a wired interface and a wireless interface. External wireless client devices may associate with the AP and the AP may forward traffic received from the wireless clients. The AP includes a virtual client which is to simulate a wireless client device.

15 Claims, 11 Drawing Sheets

(56) References Cited

U.S. PATENT DOCUMENTS

| | | | |
|---|---|---|---|
| 2008/0043638 A1 | 2/2008 | Ribiere et al. | |
| 2008/0268853 A1 | 10/2008 | Bosch et al. | |
| 2009/0190726 A1 | 7/2009 | Yahyaoui et al. | |
| 2009/0209250 A1 | 8/2009 | Huq | |
| 2009/0268664 A1 | 10/2009 | Hirano et al. | |
| 2010/0278120 A1 | 11/2010 | Haddad et al. | |
| 2011/0019557 A1 | 1/2011 | Hassan et al. | |
| 2013/0094486 A1 | 4/2013 | Bhanage et al. | |
| 2015/0103679 A1 | 4/2015 | Tessmer et al. | |
| 2015/0126129 A1 | 5/2015 | Rangappagowda et al. | |
| 2015/0257019 A1 | 9/2015 | Durai et al. | |
| 2015/0339216 A1 | 11/2015 | Wade | |
| 2016/0056927 A1 | 2/2016 | Liu et al. | |
| 2020/0280576 A1* | 9/2020 | Key | H04L 63/20 |
| 2020/0295988 A1* | 9/2020 | Bolding | H04L 41/0894 |
| 2020/0336464 A1* | 10/2020 | Hastings | H04L 63/0478 |
| 2020/0374127 A1* | 11/2020 | Wei-Kocsis | H04L 63/123 |
| 2020/0412824 A1* | 12/2020 | Liguori | H04L 12/4641 |

FOREIGN PATENT DOCUMENTS

| | | |
|---|---|---|
| CN | 102905296 A | 1/2013 |
| WO | 2014/107206 A1 | 7/2014 |
| WO | 2016/108880 A1 | 7/2016 |

OTHER PUBLICATIONS

International Search Report & Written Opinion received in PCT Application No. PCT/CN2017/100141, dated May 30, 2018, 9 pages.

\* cited by examiner

ACCESS POINTS WITH VIRTUAL CLIENTS

BACKGROUND

A wireless local area network (WLAN) includes a number of access points (APs). Client devices may wirelessly connect to the APs in order to communicate with each other or in order to send or receive data over a wired network, which is accessible via the APs. The functioning of a WLAN may be tested by a client device sending test packets to an AP.

BRIEF DESCRIPTION OF THE DRAWINGS

Examples of the disclosure will now be described, by way of non-limiting example, with reference to the accompanying drawings, in which.

DETAILED DESCRIPTION

Figure 1:
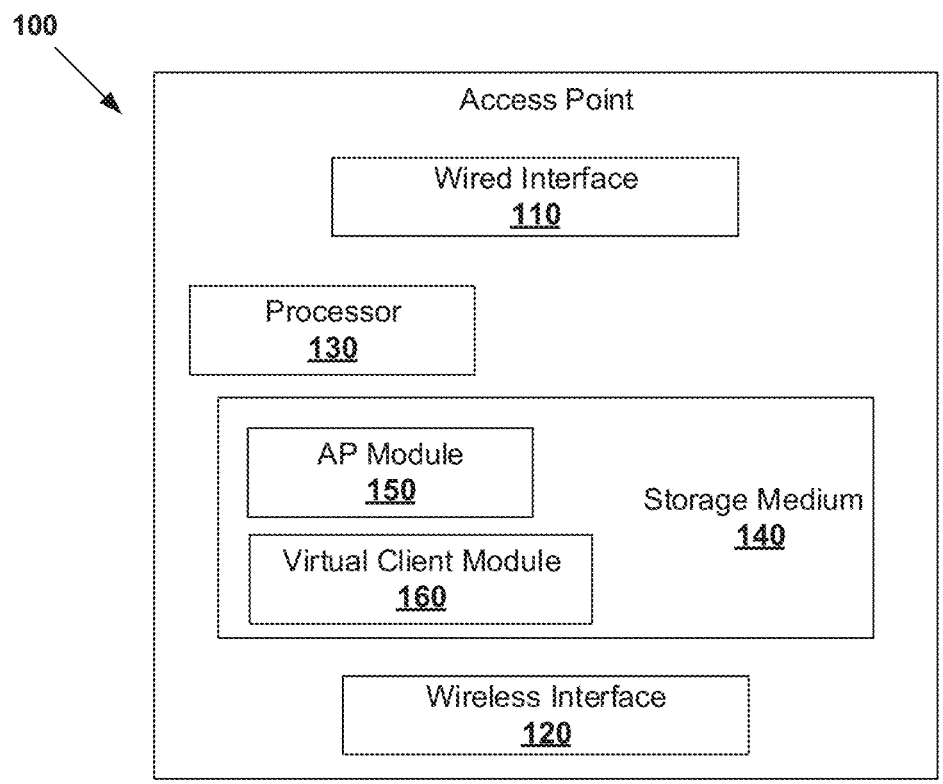
FIG. 1 is a schematic view of an example access point (AP) according to the present disclosure.

For simplicity and illustrative purposes, the present disclosure is described by referring mainly to examples thereof. As used herein, the terms "includes" means includes but not limited to, the term "including" means including but not limited to. The term "comprises" means includes but not limited to, the term "comprising" means including but not limited to. The term "based on" means based at least in part on. The term "number" means any natural number equal to or greater than one. The terms "a" and "an" are intended to denote at least one of a particular element.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

A wireless local area network (WLAN) may be tested by a wireless client device running various test programs. For example, a test program may be installed on a laptop computer and the laptop computer may wirelessly associate with an AP and send test messages to the AP. The test messages may be designed to test particular aspects of the WLAN, such as connectivity, DHCP functions, WLAN throughput, download speed etc. By monitoring the timing and content of responses to the test messages, or noting when no response is received, the test program running on the client device may gather information on the functioning of the WLAN and determine which aspects of the WLAN are operating correctly.

However, the above approach is inconvenient in that the client device has to be physically moved to the WLAN in question by a field engineer. Therefore, another approach is to temporarily convert an AP into a client by installing client firmware and a test program on the AP to replace the normal AP firmware. This effectively converts the AP into a client device which can test the WLAN. The client firmware and test program are sometimes referred to as a "clarity client". The clarity client may wirelessly associate with another AP, generates test traffic, send test traffic over the wireless link to the other AP and receives return packets from the other AP.

However, this approach of converting the AP to a clarity client has the drawback that the AP cannot continue to function as an AP to service its associated clients.

Accordingly, the present disclosure proposes an access point which includes both an access point module and a virtual client module. A wireless client may be associated with the AP through the access point module, while the virtual client module may be associated with an external AP. The access point may operate the virtual client module while the wireless client still remains associated with the AP.

According to one example of the present disclosure, an access point (AP) comprises: a wired interface, a wireless interface, a processor and a non-transitory machine readable storage medium storing instructions executable by the processor to allow external wireless clients to be associated with the AP and forward traffic received from the external wireless clients. The instructions further include instructions to set up a virtual client in the AP and associate the virtual client with an external AP; receive, from a server via the wired interface, test traffic that is to be sent to the external AP in order to test a wireless local area network (WLAN); decapsulate the test traffic received from the server and forward, by the virtual client, the decapsulated test traffic over the wireless interface to the external AP.

In one example, a test program which generates test traffic may be installed on the server and layer 3 and higher level network protocols for the virtual client may be handled by the server, rather than the by virtual client module on the AP.

Several examples will now be described with reference to the accompany drawings.

FIG. 1 shows an example access point (AP) 100 which includes a wired interface 110, a wireless interface 120, a processor 130 and a storage medium 140. The wired interface 110 is an interface to send and receive communication signals over a physical medium such as an electrical or fiber optical cable. The wired interface may include one or more ports. In one example, the wired interface is an Ethernet interface. The wireless interface 120 is an interface to send and receive wireless communication signals. The wireless interface may for example include one or more radios.

The processor 130 may for example be a central processing unit (CPU), processing unit, application specific integrated circuit (ASIC), logic unit, or programmable gate array etc. The storage medium 140 may be a non-transitory machine readable storage medium, for example be a random access memory, a read only memory, a flash memory, etc. The storage medium may store instructions which are executable by the processor to carry out various functions of the access point. The instructions may include an access point module 150 which implements access point functionality such as allowing external wireless client devices to be associated with the access point and forwarding messages to and from the associated external wireless client devices. The instructions may further include a virtual client module 160 which is to implement a virtual client on the access point. The virtual client acts like a real wireless client and may associate with other external access points as a client device via wireless interface 120.

The access point 100 implements the virtual client module 160 without shutting down the access point module 150. In this way, the access point 100 can operate the virtual client module 160, without disassociating external wireless client devices which are associated with the access point. It is possible to test a wireless local area network (WLAN) by sending test traffic through the virtual client module 160, while still providing wireless services to external wireless clients associated with the access point 100.

Figure 2:
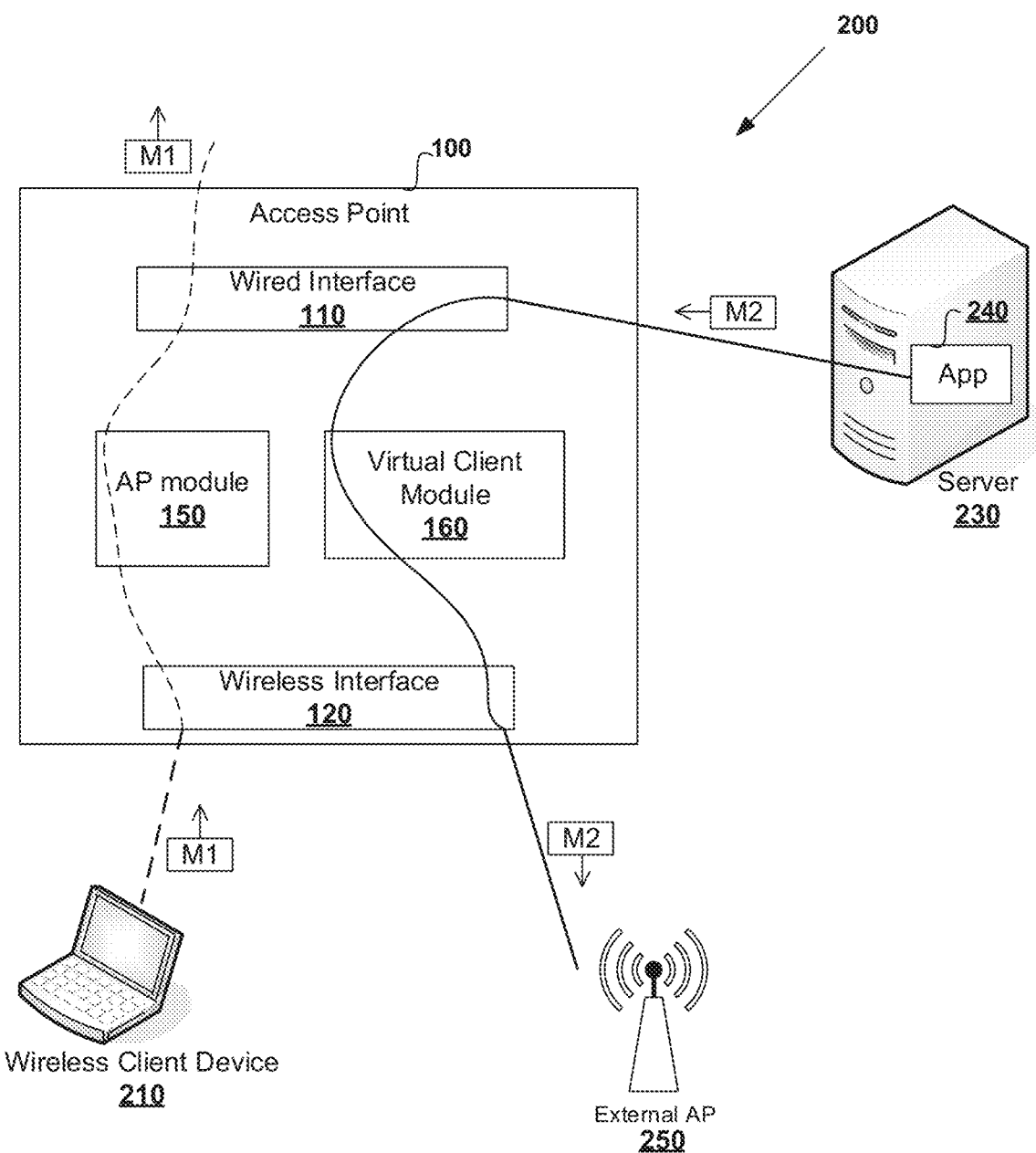
FIG. 2 is a schematic view of an example wireless local area network (WLAN) according to the present disclosure, including an AP and a wireless client device.

FIG. 2 shows an example of a wireless local area network (WLAN) 200 including the access point (AP) 100. External wireless client devices, such as a first wireless client device 210 may associate with the AP 100. Association may refer to the process by which a wireless client device registers with the AP to gain access to the WLAN through the AP. Association establishes a data link between the wireless client and the AP and enables messages to be sent back and forth between the wireless client and the AP.

The first wireless client device 210 may wirelessly send messages, such as a first message M1, to the AP 100 and the AP 100 may receive such messages via the wireless interface 120. Just a single external wireless client device 210 is shown in FIG. 2, but it is to be understood that a plurality of external wireless client devices may be associated with the AP 100. In some cases a large number, such as tens or even hundreds, of external wireless client devices may be associated with the AP.

The AP module 150 may handle traffic, such as the first message M1, received via the wireless interface 120 from an external wireless client device (e.g., wireless client device 210). The AP module 150 may forward such messages through the wired interface 110 or through the wireless interface 120 towards a destination. For example, the AP may forward the message M1 through the wired interface 110, if the message M1 is addressed to a network device or client device on the wireless local area network, or to a network device or client device accessible via a wired network or the Internet. However, if the message is addressed to another wireless client device associated with the same AP 100, then the AP module may forward the message to the another wireless client device via the wireless interface 120. Further, the AP module 150 may forward, via the wireless interface 120, any messages which are received by the AP 100 and addressed to first wireless device 210.

A server 230 is connected to the wired interface 110 of the AP 100. The connection may be a direct connection via a cable, or an indirect connection via one or more intermediate devices or networks. For example, the server 230 may be connected to the wired interface 110 via a wireless controller, and/or a switch/router in a wired local area network (not shown in FIG. 2). An application 240 running on the server 230 may generate traffic which is to be sent to the virtual client module 160 of the AP 100. The application 240 may for example be a test program which is to generate test traffic and carry out various tests on a WLAN. The application 240 may in some examples be run on a virtual machine which is hosted by the server 230.

The virtual client module 160 on the AP 100 is to simulate a wireless client and associates with an external access point 250. The virtual client module 160 thus acts as a client associated with the external access point 250. The virtual client module 160 is able to send messages to the external access point 250 via the wireless interface 120 and receive messages from the external access point 250 via the wireless interface 120.

The virtual client module 160 is to receive traffic, such as a second message M2, sent from the server 230 and forward the traffic to the external access point 250 which the virtual client is associated with. Thus, as shown in FIG. 2, a second message M2, generated by the application 240 on the server 230, is sent over a wired communication path between the server 230 and the AP 100. The second message M2 is then forwarded by the virtual client module 160 via the wireless interface 120 to the external access point 250. The virtual client module 160 may also receive traffic from the external access point 250 via the wireless interface 120. The traffic received from the external access point may be addressed to the virtual client and the virtual client module 160 may forward such traffic to the application 240 on the server 230.

Figure 3:
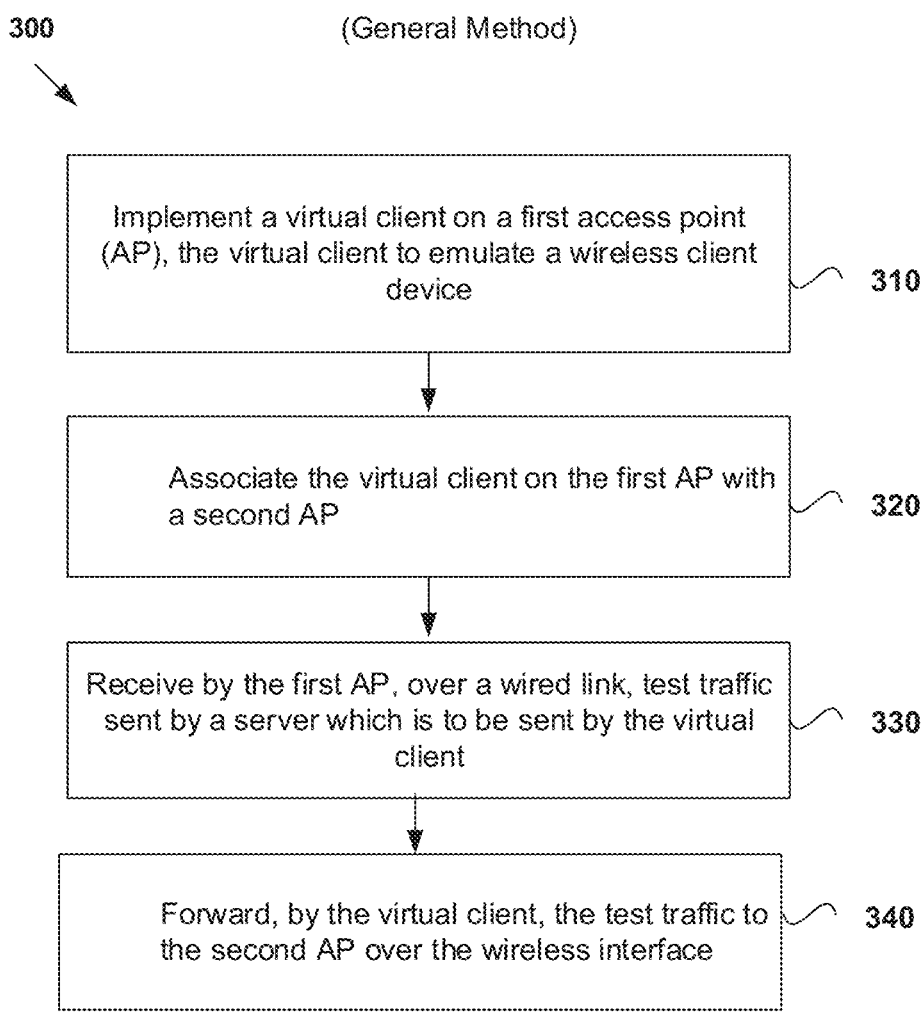
FIG. 3 shows an example method of operation of the AP of FIGS. 1 and 2.

FIG. 3 shows an example method of operation of the apparatus of FIGS. 1 and 2. At block 310 a virtual client 160 is implemented on the AP 100 (which may be referred to as the 'first AP'). The virtual client emulates a wireless client device. At block 320 the virtual client associates with the external AP 250 (which may be referred to as the 'second AP'). At block 330 the first AP receives, over a wired link, test traffic sent by a server 230 which is to be sent by the virtual client. At block 340 the virtual client forwards the test traffic to the second AP 250 over a wireless interface 120.

An application which tests a WLAN may be referred to as a "clarity client". The clarity client may generate test traffic, send the test traffic to an access point of a WLAN under test and analyze any traffic returned to the clarity client. In the case of FIG. 2, the clarity client comprises two parts—the application 240 on the server 230 which can generate and analyze traffic and the virtual client module 160 which can connect with the external access point 250 and wirelessly send traffic to the external access point 250. In some examples, the application 240 may generate multiple streams of test traffic, whereas each stream of test traffic is to be sent by a different virtual client module on a different AP in the WLAN.

The application 240 running on the server 230 may take care of processor heavy functions such as generating test traffic and analyzing a result of the test. The server 230 may also take care of higher level network functions of the virtual client such as operations at layer 3 and higher. Thus layer 3 operations (e.g., DNS, DHCP, ARP operations) of the virtual client ("clarity client") may be handled by the server 230 and wireless layer 2 operations (e.g. association, encapsulating data in MAC frames and MPDUs, transmitting and receiving packets) of the virtual client ("clarity client") may be handled by the AP 100. This reduces the burden on the virtual client module 160 of the AP 100 which may then take care of lower level functions of the virtual client, which are less processor intensive, such as layer 2 processing of test traffic and wireless connection to the external access point 250.

In this way, the AP 100 may support both access point functionality and virtual client functionality, without undue load on the processor. Furthermore, compared to having all of the clarity client functions on the AP 100, placing higher level functions on the server 230 may provide greater flexibility and processing power. In general it may be easier to change the clarity client on the server 230 compared to the AP 100, as the firmware of the AP 100 may be more limited and less configurable than software running on the server 230. Furthermore, the server may have greater processing power than an access point.

The AP 100 may include a wireless communication module (not shown in FIG. 2), which may be implemented as instructions stored in the storage medium and executable by the processor and/or by hardware logic. The wireless communication module may be responsible for physically sending and receiving wireless signals and implementing basic wireless protocols such as IEEE 802.11 type protocols. The access point module 150 and the virtual client module 160 may communicate with the wireless interface 120 via the wireless communication module.

In order for the virtual client module 160 to communicate with the server 230, the AP 100 may encapsulate messages sent to the server 230 and decapsulate messages received from the server 230. For example the messages may be encapsulated with a tunnel header and sent over a tunnel established between the server 230 and the virtual client module 160.

Further, the access point module 150 and the virtual client module 160 may have different IP addresses. The IP address of the access point module 150 may be considered to be the management IP address of the access point 100, which may be used by a wireless controller to send control messages to the access point 100. The IP address of the virtual client module 160 may be considered to be the IP address of the virtual client and may be used by external entities, such as the server 230 and the external access point 250, to communicate with the virtual client. In this way, based on the IP address, the AP 100 is able to distinguish messages intended for the access point module 150 and messages intended for the virtual client module 160.

Figure 4:
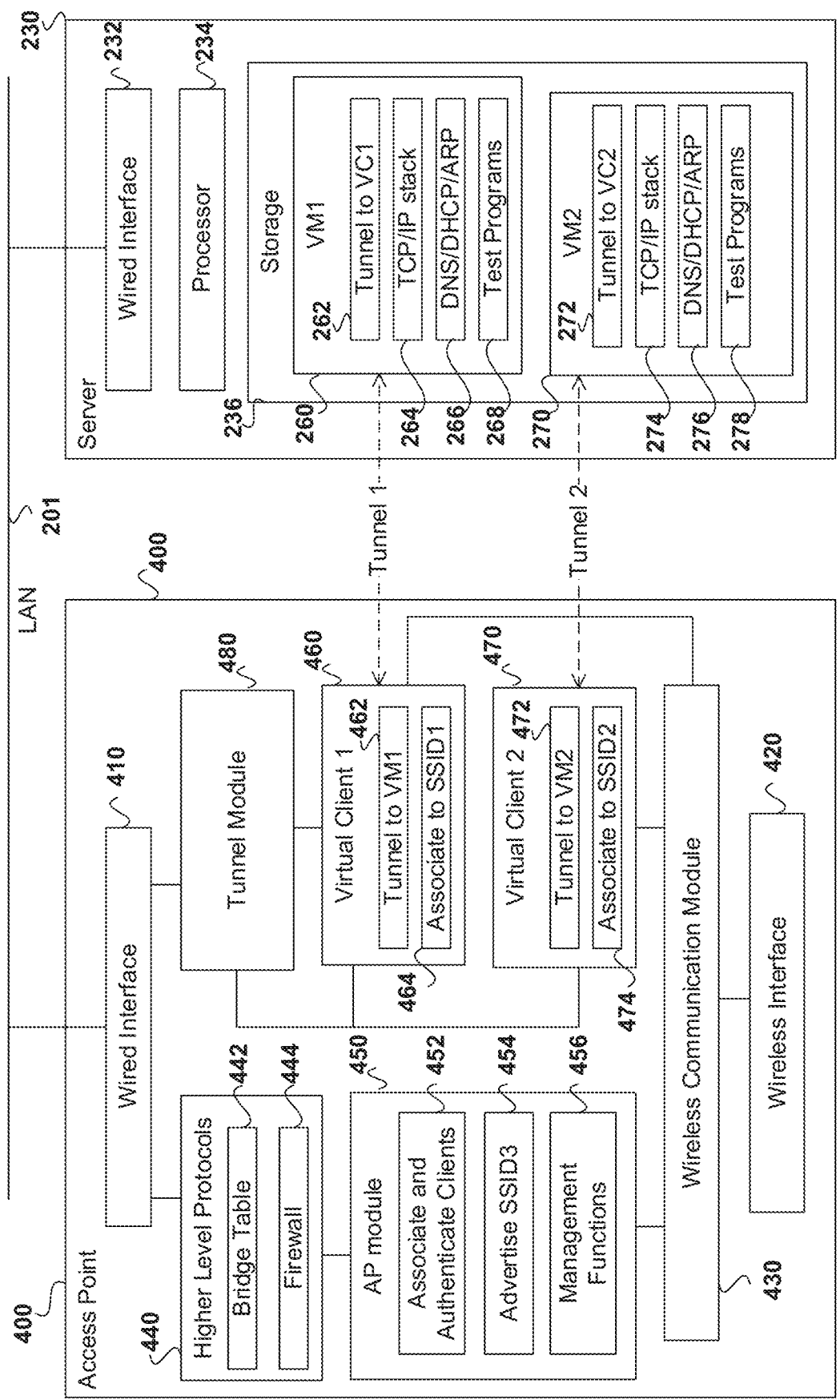
FIG. 4 is a schematic view of an example AP and server according to the present disclosure.

FIG. 4 shows another example of an AP 400 according to the present disclosure together with a server 230. Similar to the AP 100 of FIG. 2, the AP 400 of FIG. 4 includes a wired interface 410, a wireless interface 420, an access point module 450 and a virtual client module 460.

The AP 400 also includes a wireless communication module 430 for physically sending and receiving wireless signals and implementing basic wireless protocols.

The wireless communication module 430 may be a layer 2 module which is to convert communications between wired and wireless formats. For example, the wireless communication module may convert a wireless protocol frame received at the wireless interface 410 into a wired protocol frame and forward the wired protocol frame to the access point module 450 or to a virtual client module 460, 470. The wireless module 430 may receive a wired protocol frame from the access point 450 module or a virtual client module 460, 470, convert the received wired protocol frame into a wireless protocol frame and forward the wireless protocol frame via the wireless interface 420.

The wireless communication module 430, access point module 450 and virtual client module 460, 470 may be implemented by hardware or a combination of hardware and firmware components, such as by a processor executing machine readable instructions stored in a non-transitory storage medium, logic circuitry, an application specific integrated chip (ASIC), a programmable gate array or combinations thereof.

The example AP 400 of FIG. 4 further includes a second virtual client module 470. Thus the AP 400 may emulate two separate virtual clients. The first virtual client module 460 and the second virtual client module 470 may have different IP addresses. The first virtual client module and second virtual client module may be configured to associate with the same external access point or to associate with different external access points. While two virtual client modules are shown in FIG. 4, in other examples there may be one virtual client module or more than two virtual client modules.

A higher level protocol module 440 may handle higher level protocols for the AP module 450. For example the module 440 may include a bridge table 442 and a firewall 444. The bridge table may be used to determine how to forward communications received by the access point module 450. The firewall 444 may filter communications based on security rules.

The wired interface 410 of the AP 400 may be connected to a wired communication link, such as a LAN 201. The LAN may include a wireless controller (not shown) which is to manage the AP 400. A server 230 may communicate with the AP 400 via the wired communication link. A tunnel module 480 of the AP 400 may construct one or more tunnels between the server 230 and the AP 400.

The higher protocol module 440, the second virtual client module 470 and the tunnel module 480 may be implemented by hardware or a combination of hardware and firmware components, such as by a processor executing machine readable instructions stored in a non-transitory storage medium, logic circuitry, an application specific integrated chip (ASIC), a programmable gate array or combinations thereof.

The server 230 may include a wired communication interface 232, a processor 234 and a storage medium 236. The wired interface 232 is an interface to send and receive communication signals over a physical medium such as an electrical or fiber optical cable. The wired interface may include one or more ports. In one example, the wired interface is an Ethernet interface. The processor 234 may for example be a central processing unit (CPU), processing unit, application specific integrated circuit (ASIC), logic unit, or programmable gate array etc. The storage medium 236 may be a non-transitory machine readable storage medium, for example be a random access memory, a read only memory, a flash memory, a disk drive etc. The storage medium may store instructions which are executable by the processor to carry out various functions of the server.

The storage medium 236 may store instructions to implement a number of virtual machines on the server. Merely by way of example, FIG. 4 shows two virtual machines: a first virtual machine 260 (VM1) and a second virtual machine 270 (VM2). The first virtual machine 260 is connected by a first tunnel (tunnel 1) to the first virtual client 460 of AP 400 and the second virtual machine 270 is connected by a second tunnel (tunnel 2) to the second virtual client 470 of AP 400. In this way the first virtual machine 260 may generate and send test traffic to the first virtual client 460, while the second virtual machine 270 may generate and send test traffic to the second virtual client 470.

A tunnel may refer to a virtual link which is implemented over the physical wired link between the server 230 and the AP 400. Each tunnel may have an endpoint at the virtual client module of the AP 400 and an end point on the server 230. For example, one of the end points may be a virtual machine on the server. Traffic sent through the tunnel may be encapsulated with a tunnel header at the ingress end of the tunnel and decapsulated at the egress end of the tunnel. Traffic may be sent in both directions across the tunnel.

As shown in FIG. 4, the first virtual client module 460 (also referred to herein as "tie first virtual client") may include a tunnel function 462 to connect via first tunnel to first virtual machine 260 of the server 230. The tunnel function 462 may handle encapsulation and decapsulation of messages sent through the tunnel. Likewise, the second virtual client module 470 (also referred to herein as "the second virtual client") may include a tunnel function 472 to connect via a second tunnel to second virtual machine 270 of the server 230. The tunnel functions 462, 472 may act in collaboration with tunnel module 480, which may for example determine whether a message with a tunnel header received at the wired interface 410 should be directed to the first virtual client 460 or the second virtual client 470. This determination may for example be determined based on a tunnel ID in the tunnel header of the message.

The first virtual client 460 further includes an instruction 464 to join a WLAN by associating with an external access point. For example this may be an instruction to join a WLAN having a particular service set identifier (SSID). SSID1 is given as an example in FIG. 4. The actual process of the virtual client joining the WLAN may be handled by the wireless communication module 430 on the basis of this instruction. Likewise, the second virtual client 470 further includes an instruction 474 to join a WLAN by associating with an external access point. For example this may be an instruction to join a WLAN having a particular service set identifier (SSID). SSID2 is given as an example in FIG. 4. Thus, in the illustrated example, the first and second virtual clients are configured to join different WLANs. In other examples, the first virtual client and the second virtual client may be configured to join the same WLAN.

The first virtual machine 260 may include a tunnel function 262 to connect to the first tunnel. The tunnel function may encapsulate messages to be sent over the tunnel and encapsulate messages received over the tunnel. The first virtual machine 260 may further include a transmission control protocol/internet protocol (TCP/IP) stack 264 to implement layer 3 communication protocols and a DNS/DHCP/ARP stack 266 to handle domain name server (DNS), dynamic host configuration protocol (DHCP) and/or address resolution protocol (ARP) requests. By handling these higher level communication protocols on the server, the first virtual client module 460 on the AP 400 just needs to handle lower layer protocols and the processing burden on the AP is reduced. For example, the first virtual client module 460 may handle layer 2 wireless protocols with the assistance of the wireless communication module 430. The virtual machine 260 may further include one or more test programs 268 which are to test a WLAN. For example, the test program 268 may generate test traffic which is to be sent by the virtual client, may receive traffic sent to the virtual client and may analyse and/or present results of tests carried out on the WLAN.

Similar to the first virtual machine 260, the second virtual machine 270 may include a tunnel function 272, a TCP/IP stack 274, a DNS/DHCP/ARP stack 276 and one or more test programs 278.

The access point module 450 may include instructions 452 to associate with and authenticate wireless client devices. This function may instruct the wireless communication module 430 to associate and authenticate wireless client devices which request to join the AP 400. The access point module may further include advertisement instructions 454 to advertise a SSID of the AP 400.

In FIG. 4, SSID3 is shown as an example of an SSID of the AP 400 which is advertised by the access point module 450. This is a different SSID to the SSID(s) joined by the virtual client modules 460 and 470. Thus the virtual clients join external access point(s) that belong to a different SSID than the SSID of the access point module 450. In other examples one or more virtual clients could be configured to join the same SSID as the access point module. In that case the virtual clients may associate as clients with an external access point which belongs to the same SSID as the access point 400. The access point module may further include instructions to perform certain management functions 456 which may be determined by a wireless controller which manages the AP 400. The wireless controller (not shown) may for example connect directly or indirectly to the AP 400 via the wired interface 410.

Figure 5:
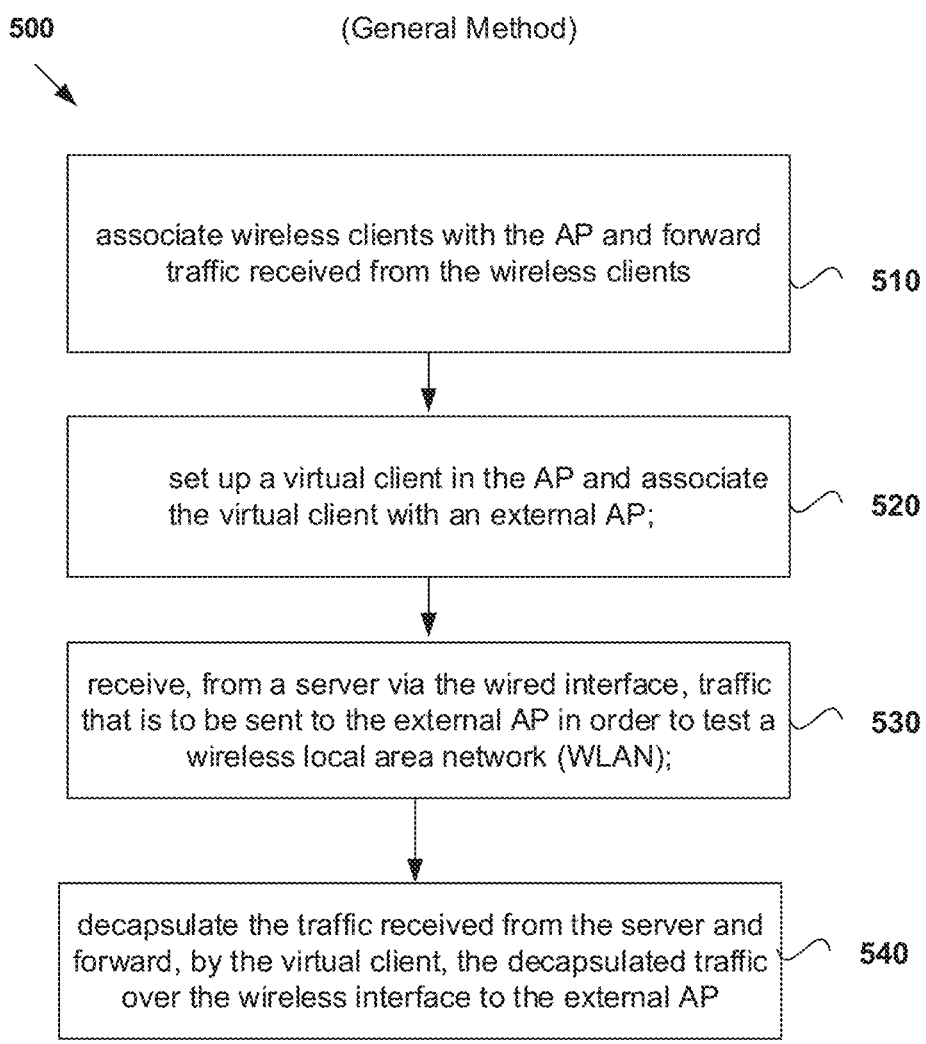
FIG. 5 shows an example method of operation of an AP according to the present disclosure.

FIG. 5 shows an example method 500 of operation of the AP 400.

At block 510, the AP associates with wireless clients and forwards traffic received from the wireless clients.

For example, block 510 may be performed by the access point module 450 in collaboration with the wireless communication module 430. Messages which the AP 400 receives from the associated wireless clients may be forwarded back over the wireless interface 420 to another wireless device or forwarded over the wired interface 410, depending on the destination of the message. In some examples, messages forwarded over the wired interface 410 may be forwarded in accordance with a matching entry in the bridge table 442.

At block 520, the AP 400 sets up a virtual client in the AP and associates the virtual client with an external AP (e.g. such as AP 250 in FIG. 2). For example, block 520 may he implemented by the virtual client module 460 in collaboration with the wireless communication module 430.

At block 530, the AP 400 receives via the wired interface 410, traffic from a server 230. The traffic received from the server is to be sent to the external AP in order to test a wireless local area network (WLAN).

At block 540, the AP 400 decapsulates the traffic received from the server 230 and forwards the decapsulated traffic over the wireless interface 420 to the external AP. For example, block 540 may be implemented by the virtual client module 460.

The virtual client module 460 may receive test traffic, via the wired interface 410, from a virtual machine 260 on the server 230 and forward the test traffic to an external access point 250 over the wireless interface 420. The virtual client module 460 may receive from the external access point 250, via the wireless interface 420, traffic addressed to the virtual client and may forward the traffic, via the wired interface 410, to the virtual machine 260 on the server 230.

In some examples, the AP 400 may set up a plurality of virtual clients 460, 470, each virtual client associated with a respective tunnel. The AP 400 may receive test traffic from a server via the respective tunnel and forward the test traffic over the WLAN. If there are several virtual clients on the AP 400, then a tunnel module 480 may determine which virtual client the traffic is addressed to and forward the traffic to the appropriate virtual client module.

For example, the test traffic received over the wired interface 410 from the server 230 may comprise a wired protocol frame encapsulated in a tunnel header indicating a virtual client (e.g. 460 or 470) to which the test traffic is addressed. The AP 400 may de-capsulate the wired protocol frame, convert the wired protocol frame into a wireless protocol frame and forward the wireless protocol frame via the wireless interface 420 over the WLAN to the external AP associated with the virtual client.

The AP 400 may receive, via the wireless interface 420, a wireless protocol frame from the external AP. The wireless protocol frame may be addressed to a virtual client which is hosted by the AP 400. The AP 400 may convert the wireless protocol frame to a wired protocol frame, encapsulate the wired protocol frame with a tunnel header and forward the wired protocol frame via the wired interface over a tunnel to the server.

For example, if the wireless protocol frame is addressed to the virtual client provided by the first virtual client module 460, then the wireless communication module 430 may convert the wireless frame to a wired frame and send the wired frame to the first virtual client module 460. The first virtual client module 460 may encapsulate the wired protocol frame with a tunnel header and forward the wired protocol frame, via the wired interface 410, over the first tunnel to the first virtual machine 260.

The tunnel header may for example include an identifier of the tunnel connecting the virtual client module on the AP and corresponding application on the server. In some examples, the tunnel header may include an IP address of the virtual client module and/or an IP address of the virtual machine or server hosting the test application. In some examples, the tunnel header may be generic routing encapsulation (GRE) header.

Figure 6:
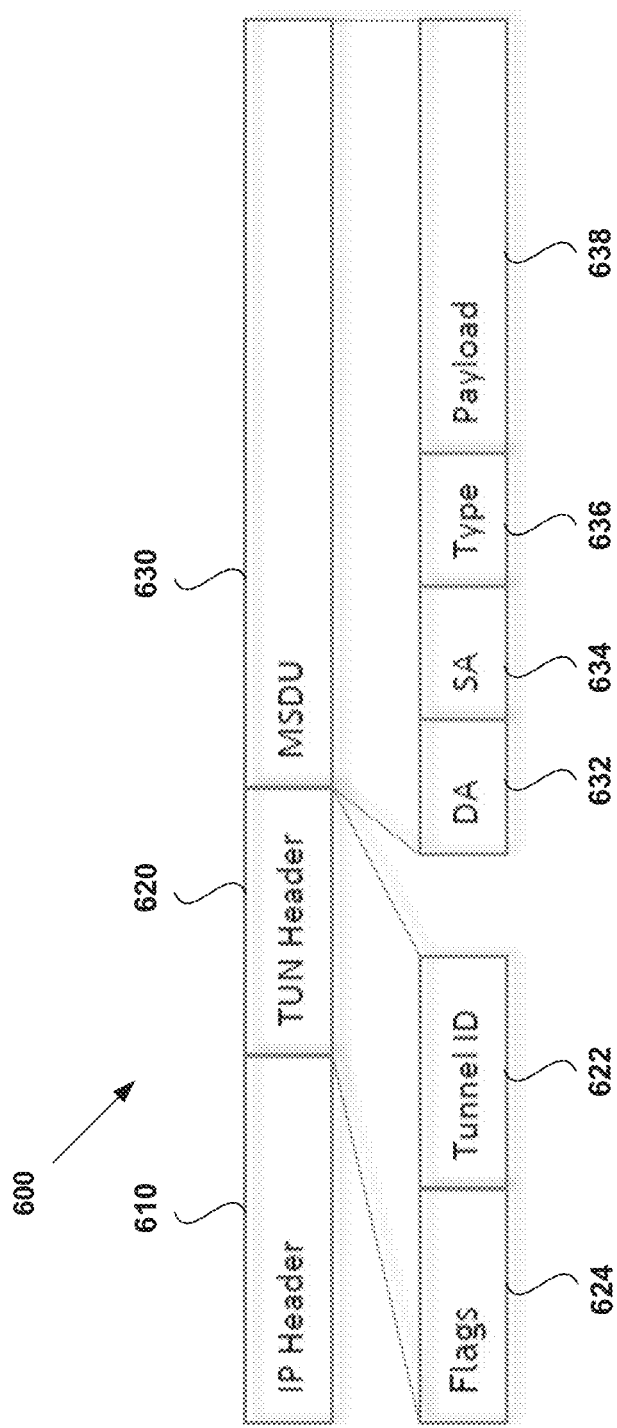
FIG. 6 shows an example structure of a wired protocol frame encapsulated with a tunnel header.

FIG. 6 shows an example of a wired frame encapsulated with a tunnel header according to one example of the present disclosure. The encapsulated wired frame 600 includes an IP header 610 which may include a destination IP address and a source IP address. For example, if the frame is being sent from the first VM 260 on the server 230 to the first virtual 460 client on the AP 400, then the destination IP address may be an IP address of the first virtual client 460 and the source IP address may be the IP address of the first VM 260.

The encapsulated frame may include a tunnel header 620. The tunnel header 620 includes a tunnel ID 622 indicating which tunnel the frame is to be sent over. The tunnel header 620 may also include various flags 624 including information relating to operation of the tunnel. The encapsulated wired frame may further include a media access control service data unit (MSDU) 630. A MSDU 630 may refer to a basic data unit which is to be sent over a wireless interface and may include one or more wired frames, such as Ethernet frames. The wireless communication module 430 may convert MSDUs to wireless frames which are sent over the wireless interface 410 and may convert received wireless frames into MSDUs. The MSDU may include a MAC destination address 632, a MAC source address 634, a message type 636 and a data payload 638. The MSDU may be an aggregated MSDU which includes a payload which aggregates the payload from a plurality of wireless frames which have the same source and destination addresses.

Various methods may be carried out by the APs, servers and virtual machines referred to above and will now be described below. It is to be understood that these methods may be encoded in instructions stored on a non-transitory machine readable storage medium and executed by a processor of the AP or server as the case may be.

The AP 400 may set up the virtual client module(s) 460, 470 in response to receiving a request from a network administrator to test a WLAN. The request may include a SSID of the WLAN to be tested and an ID of a server from which the virtual client module is to receive test traffic.

Figure 7:
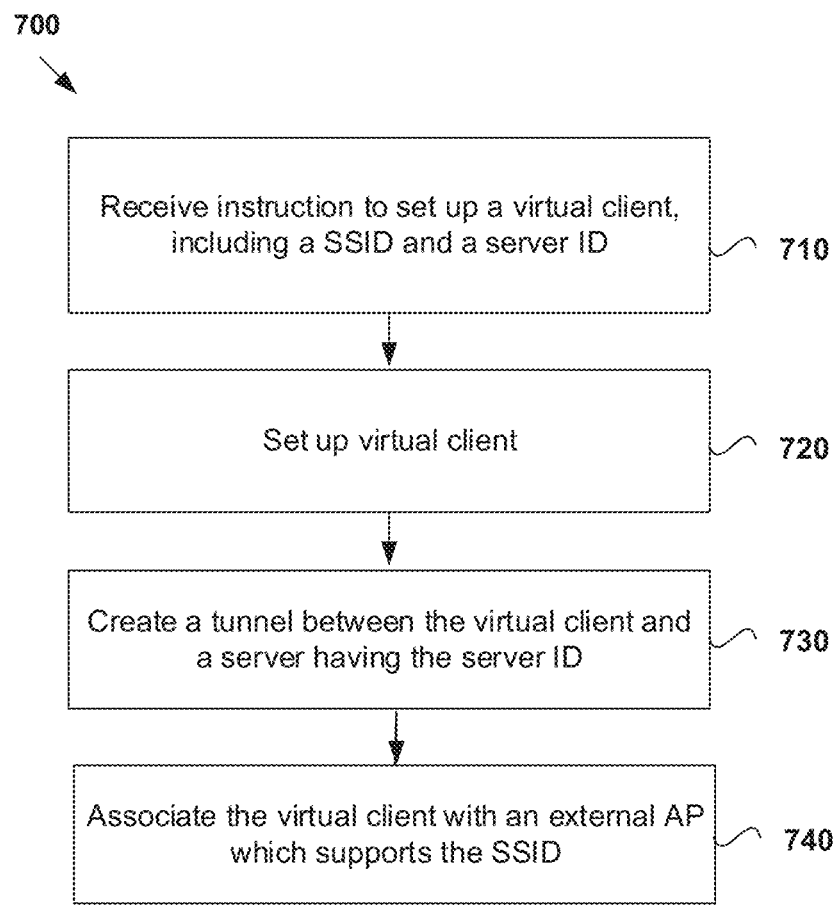
FIG. 7 shows an example method of setting up a virtual client on an AP according to the present disclosure.

FIG. 7 shows an example method of setting up a virtual client on an AP.

At block 710, the AP receives instruction to set up a virtual client, including a SSID and a server ID. The ID of the server may be an IP address of a virtual machine on a server which hosts a test program for generating test traffic.

At block 720, in response to receiving these instructions, the AP creates the virtual client, for example by setting up a virtual client module on the AP.

At block 730, the AP creates a tunnel between the virtual client and a server having the server ID.

At block 740, the virtual client associates with an external AP which supports the SSID.

Figure 8:
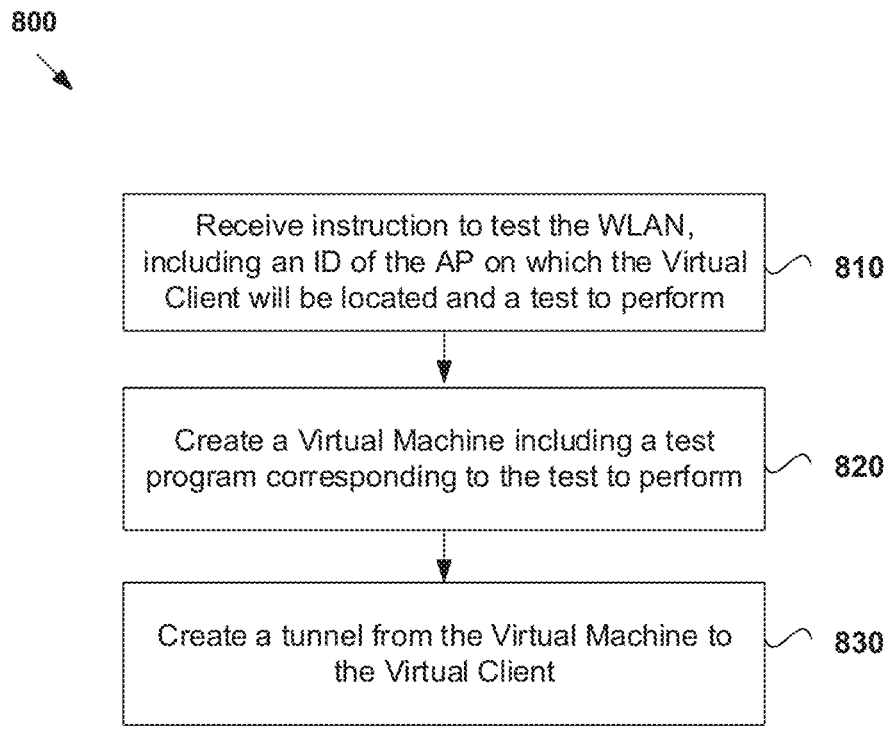
FIG. 8 shows an example method of setting up a virtual machine on a server according to the present disclosure.

The virtual machine hosting the WLAN testing application may be set up in response to the same or a similar instruction from the network administrator. FIG. 8 shows an example method 800 of setting up the virtual machine.

At block 810, the server receives an instruction to test the WLAN. The instruction includes an indication of the type of test to perform on the WLAN and an ID of an AP on which a virtual client is to be located. The ID of the AP may for example be the management IP address of the AP. The management IP address of the AP is distinct from the IP address of the virtual client which is not determined until the virtual client DHCP succeeds.

At block 820, the server creates a virtual machine and loads into the virtual machine a test program corresponding to the test that is to be performed on the WLAN. Higher level protocol support may also implemented by the virtual machine, as indicated in FIG. 4.

At block 830, the server creates a tunnel from the virtual machine to the virtual client module in the AP. The server is able to contact the AP based on an ID of the AP is indicated in the instruction received at block 810.

The test program loaded into the virtual machine may include instructions to generate at least one of a DHCP request, a DNS request and an ARP packet. Such packets may be sent through the tunnel to the virtual client module on the AP and wirelessly forwarded by the virtual client module to an external access point in order to test the WLAN and the response of the external access point.

The test program may generate test traffic to perform at least one of the following tests: a wireless throughput performance test, a roaming test, a web download speed test and a ping test. These tests may include sending test traffic through the tunnel to the virtual client module on the access point and wirelessly forwarding the test traffic from the virtual client module to an external access point. The test traffic may be encapsulated with one or more headers including an IP address of the AP hosting the virtual client module and a tunnel ID corresponding to the virtual client module. The test traffic may comprise an IP frame including an IP address of the second AP.

As described in examples above, there may be a plurality of virtual client modules and associated virtual machines. In some cases there may be a plurality of external APs and each virtual client module may be configured to associate with a different external access point. Thus one AP hosting virtual client modules can be used to test a plurality of neighboring APs. In other examples, a plurality of virtual client modules on the AP may associate with a same external AP, rather than with different external APs. In this case, the virtual client modules may be configured to emulate two different client devices having two different IP addresses and thus test the response of the external AP to multiple different client devices.

Figure 9:
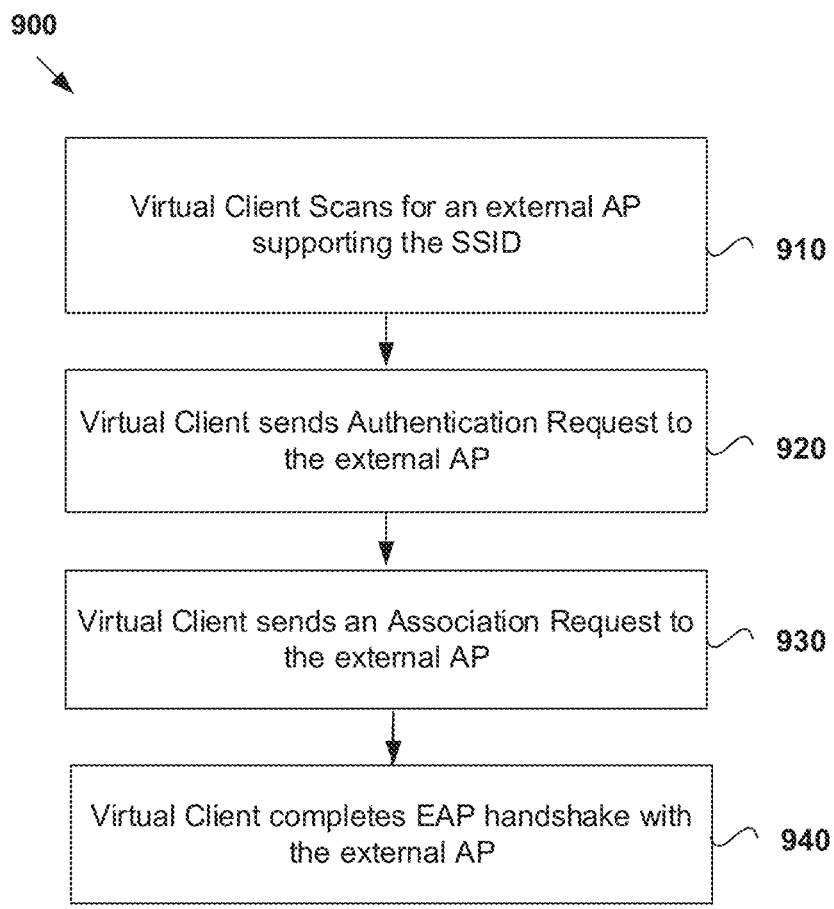
FIG. 9 shows an example method of associating a virtual client with an external AP according to the present disclosure.

FIG. 9 shows an example method 900 of a virtual client module associating with an external access point. This method may correspond to block 740 of FIG. 7 for example.

The virtual client module may include instructions for the virtual client to associate with a specific SSID.

At block 910 the virtual client scans for an external AP supporting the SSID.

At block 920, in response to detecting an external access point having the SSID, the virtual client sends an authentication request to the external AP.

Further, at block 930, the virtual client sends an association request to the external AP.

At block 940, the virtual client may complete an Extensible Authentication Protocol (EAP) handshake with the external AP.

Figure 10:
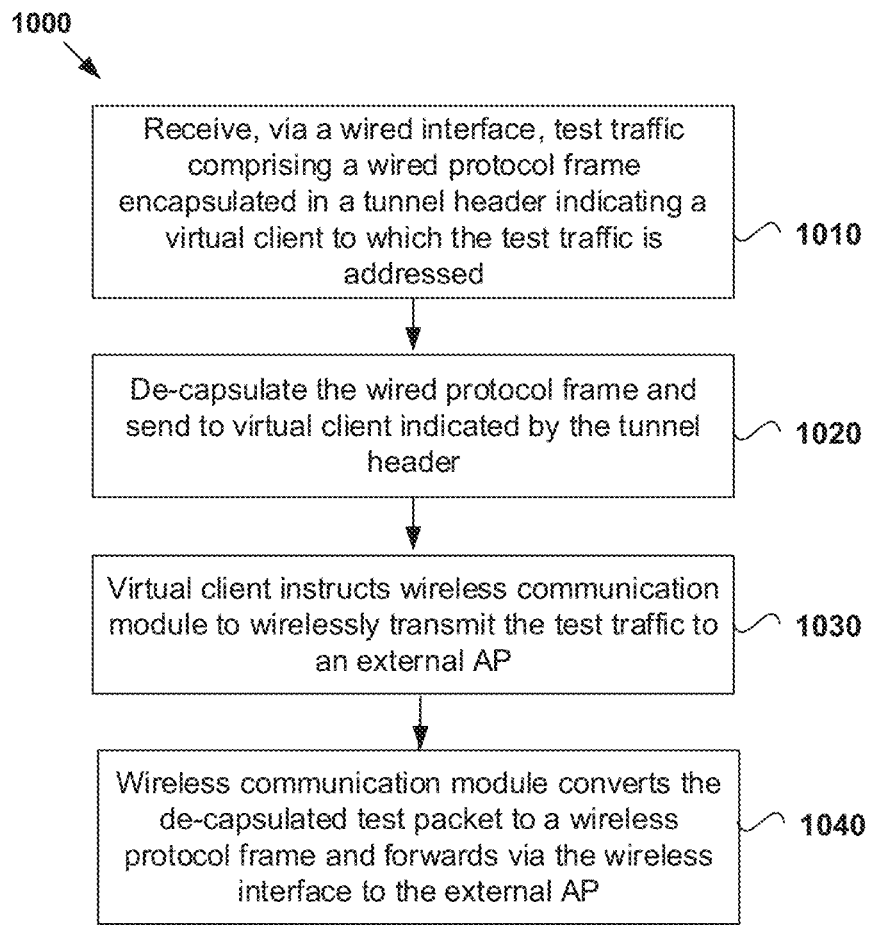
FIG. 10 shows an example method of an AP processing test traffic received from a server according to the present disclosure.

FIG. 10 shows an example method 1000 by which the AP (e.g. 400) processes test traffic received from a server.

At block 1010, the AP receives, via a wired interface, test traffic comprising a wired protocol frame encapsulated in a tunnel header indicating a virtual client to which the test traffic is addressed.

At block 1020, the AP decapsulates the wired protocol frame and sends the wired protocol frame to a virtual client (e.g. 460 or 470) indicated by the tunnel header.

At block 1030, the virtual client instructs a wireless communication module (e.g. 430) of the AP to wirelessly transmit the test traffic to an external AP (e.g. 250).

At block 1040, the wireless communication module converts the de-capsulated test packet to a wireless protocol frame and forwards the wireless protocol frame via the wireless interface (e.g. 420) to the external AP.

Figure 11:
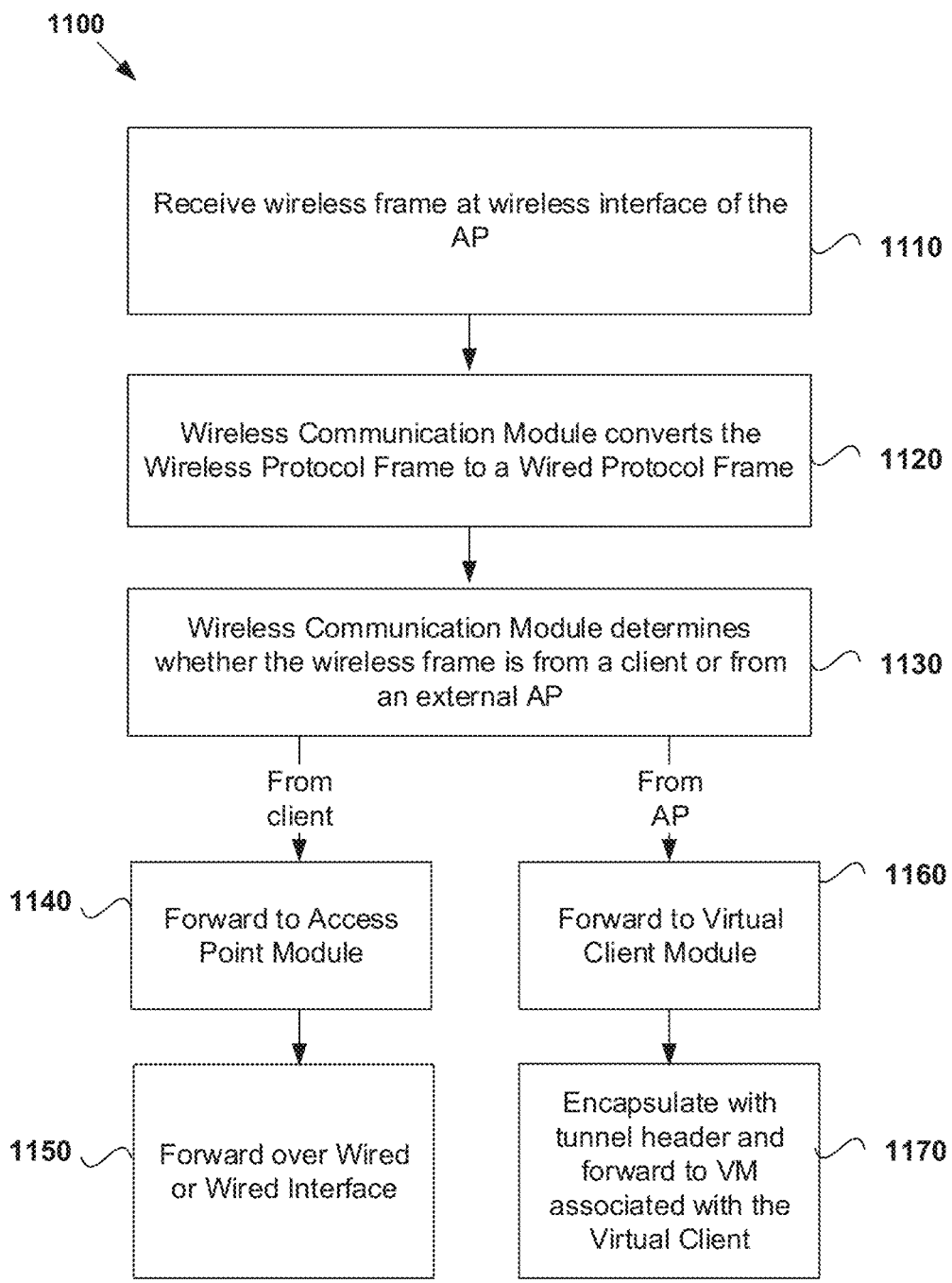
FIG. 11 shows an example method of an AP processing wireless traffic according to the present disclosure.

FIG. 11 shows an example method 1100 by which the AP (e.g. 100, 400) may process incoming wireless traffic received at the wireless interface (e.g. 120, 420). The wireless traffic may be traffic from an external wireless client (e.g. 210) which has associated with the access point, or traffic from an external access point (e.g. 250) which the virtual client (e.g. 160) of the AP has associated with.

At block 1110 a message comprising a wireless frame is received at the wireless interface (e.g. 420) of the AP.

At block 1120, the wireless communication module (e.g. 430) converts the wireless protocol frame to a wired protocol frame.

At block 1130, the wireless communication module determines whether the message came from a wireless client or from an external AP. The wireless communication module may make this determination based on information in the wireless frame. For example, the determination may be based on an address of the wireless frame and/or based on a distribution system (DS) flag of the wireless frame. For example, the determination may be based on the source MAC address, transmitter MAC address and/or destination MAC address of the wireless frame. The received wireless frame me include a From DS flag indicating that the wireless frame is intended for the virtual access point, or a To DS flag indicating that the wireless frame is intended for the access point module.

If it is determined at block 1130 that the wireless communication came from a client device, then the method proceeds to block 1140, where the communication is forwarded to the access point module (e.g. 450) of the AP.

Then at block 1150, the message is forward over a wired interface or a wireless interface of the AP. The AP module (e.g. 450) may consult a bridge table (e.g. 42) to determine how to forward the message.

If it is determined at block 1130 that the wireless communication came from an external access point, then the method proceeds to block 1160, where the communication is forwarded to a virtual client module of the AP. The wireless communication module knows to forward the message to the virtual client module rather than the access point module, as the message came from an external access point and not from an external client device. Where there is more than one virtual client module, the wireless communication module can determine which virtual client module to forward the message to based on a SSID of the message and/or a destination MAC address of the message.

At block 1170, upon receiving the message, the virtual client module encapsulates the message with a tunnel header and forwards the message via the wired interface to the server and virtual machine which is associated with the virtual client module.

All of the features disclosed in this specification (including any accompanying claims, abstract and drawings), and/or all of the blocks of any method or process so disclosed, may be combined in any combination, except combinations where at least some of such features and/or blocks are mutually exclusive. Furthermore, except where explicitly stated otherwise or where the context or logic demands otherwise, the processes described herein may be carried out in any order and are not limited to the specific order shown in the particular examples. Some the processes or method blocks described herein may be carried contemporaneously with each other.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method comprising:
    implementing a virtual client on a first access point (AP), the virtual client to simulate a wireless client device;
    associating the virtual client on the first AP with a second AP;
    receiving by the first AP, over a wired link, test traffic sent by a server which is associated with the virtual client;
    implementing a plurality of virtual machines (VMs) on the server, each VM handling layer 3 functions of a respective virtual client and running a test program to test a wireless local area network (WLAN), each VM being associated with a respective tunnel identifier (ID);
    implementing a corresponding plurality of virtual clients on the first AP, each virtual client being associated with a respective tunnel identifier (ID) and VM;
    forwarding, by the virtual client, the test traffic to the second AP over the wireless interface, wherein layer 3 operations of the virtual client are handled by the server and wireless layer 2 operations of the virtual client are handled by the first AP.

2. The method of claim 1 wherein the test traffic includes at least one of a dynamic host configuration protocol (DHCP) request, a domain name server request and an address resolution protocol (ARP) packet.

3. The method of claim 1 wherein the server generates test traffic to perform at least one of the following tests: a wireless throughput performance test, a roaming test, a web download speed test and a ping test.

4. The method of claim 1 wherein the test traffic is sent between the virtual client of the first AP and the server via a tunnel which encapsulates the test traffic with a tunnel header.

5. The method of claim 1 wherein there are a plurality of second APs and each virtual client is to associate with a different second access point.

6. The method of claim 1 wherein the plurality of virtual clients are to associate with a same second AP but to emulate a plurality of different client devices having different internet protocol (IP) addresses.

7. An access point (AP) comprising:
a wired interface;
a wireless interface;
a processor and a non-transitory machine readable storage medium storing instructions executable by the processor to:
implement a virtual client on the AP, the virtual client to simulate a wireless client device;
associate the virtual client on the AP with another AP;
receive by the AP, over a wired link, test traffic sent by a server which is associated with the virtual client;
implement a plurality of virtual machines (VMs) on the server, each VM handling layer 3 functions of a respective virtual client and running a test program to test a wireless local area network (WLAN), each VM being associated with a respective tunnel identifier (ID);
implement a corresponding plurality of virtual clients on the first AP, each virtual client being associated with a respective tunnel identifier (ID) and VM;
forward, by the virtual client, the test traffic to the other AP over the wireless interface, wherein layer 3 operations of the virtual client are handled by the server and wireless layer 2 operations of the virtual client are handled by the first AP.

8. The AP of claim 7 wherein the test traffic includes at least one of a dynamic host configuration protocol (DHCP) request, a domain name server request and an address resolution protocol (ARP) packet.

9. The AP of claim 7 wherein the server generates test traffic to perform at least one of the following tests: a wireless throughput performance test, a roaming test, a web download speed test and a ping test.

10. The AP of claim 7 wherein the test traffic is sent between the virtual client of the AP and the server via a tunnel which encapsulates the test traffic with a tunnel header.

11. The AP of claim 7 wherein there are a plurality of other APs and each virtual client is to associate with a different other access point.

12. The AP of claim 7 wherein the plurality of virtual clients are to associate with a same other AP but to emulate a plurality of different client devices having different internet protocol (IP) addresses.

13. A non-transitory computer readable medium storing instructions which, when executed by a processor, cause the processor to:
implement a virtual client on an access point (AP), the virtual client to simulate a wireless client device;
associate the virtual client on the AP with another AP;
receive by the AP, over a wired link, test traffic sent by a server which is associated with the virtual client;
implement a plurality of virtual machines (VMs) on the server, each VM handling layer 3 functions of a respective virtual client and running a test program to test a wireless local area network (WLAN), each VM being associated with a respective tunnel identifier (ID);
implement a corresponding plurality of virtual clients on the first AP, each virtual client being associated with a respective tunnel identifier (ID) and VM;
forward, by the virtual client, the test traffic to the other AP over the wireless interface, wherein layer 3 operations of the virtual client are handled by the server and wireless layer 2 operations of the virtual client are handled by the first AP.

14. The non-transitory computer readable medium of claim 13 wherein the test traffic includes at least one of a dynamic host configuration protocol (DHCP) request, a domain name server request and an address resolution protocol (ARP) packet.

15. The non-transitory computer readable medium of claim 13 wherein the server generates test traffic to perform at least one of the following tests: a wireless throughput performance test, a roaming test, a web download speed test and a ping test.

* * * * *